United States Patent
Seo

(10) Patent No.: US 12,308,985 B1
(45) Date of Patent: May 20, 2025

(54) MULTI-PARTY COLLABORATION METHODS AND SYSTEMS

(71) Applicant: Dong Seo, Middle Village, NY (US)

(72) Inventor: Dong Seo, Middle Village, NY (US)

( * ) Notice: Subject to any disclaimer, the term of this patent is extended or adjusted under 35 U.S.C. 154(b) by 0 days.

(21) Appl. No.: 18/938,996

(22) Filed: Nov. 6, 2024

(51) Int. Cl.
*H04L 12/18* (2006.01)
*H04L 65/403* (2022.01)

(52) U.S. Cl.
CPC ........ *H04L 12/1813* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 6,353,174 B1 | 3/2002 | Schmidt et al. | |
| 6,482,087 B1 * | 11/2002 | Egozy | A63F 13/12 84/645 |
| 6,653,545 B2 | 11/2003 | Redmann et al. | |
| 6,740,803 B2 | 5/2004 | Brinkman et al. | |
| 6,898,637 B2 | 5/2005 | Curtin et al. | |
| 7,405,355 B2 | 7/2008 | Both et al. | |
| 7,518,051 B2 | 4/2009 | Redmann | |
| 7,657,224 B2 | 2/2010 | Goldberg et al. | |
| 7,945,621 B2 | 5/2011 | Yuan et al. | |
| RE42,565 E | 7/2011 | Paepcke | |
| 8,653,349 B1 | 2/2014 | White et al. | |
| 8,918,484 B2 | 12/2014 | Moncavage et al. | |
| 9,274,745 B2 | 3/2016 | Clements et al. | |
| 9,661,043 B2 | 5/2017 | Walker et al. | |
| 9,697,871 B2 | 7/2017 | Hwang et al. | |
| 9,857,934 B2 | 1/2018 | Humphrey et al. | |
| 10,008,190 B1 | 6/2018 | Elson | |
| 10,080,252 B2 * | 9/2018 | Sonnleitner | G11B 27/10 |
| 10,825,480 B2 | 11/2020 | Marco et al. | |
| 11,196,808 B2 | 12/2021 | Weinberger et al. | |
| 11,341,947 B2 | 5/2022 | Yan et al. | |
| 11,546,393 B2 | 1/2023 | Goldstein et al. | |
| 11,563,504 B2 * | 1/2023 | Galuten | G10H 1/0058 |

(Continued)

FOREIGN PATENT DOCUMENTS

WO 2013133898 9/2013

OTHER PUBLICATIONS

Rottondi et al., An Overview on Networked Music Performance Technologies, Dec. 5, 2016.

*Primary Examiner* — Lance Leonard Barry
(74) *Attorney, Agent, or Firm* — Mertzlufft Law PLLC; Joshua D. Mertzlufft

(57) ABSTRACT

A method for multi-party collaboration involves utilizing a processor, network interface, input device, and output device to facilitate collaborative music creation. The method includes playing a backing track through the output device, recording a local performance via the input device, and transmitting the local performance to a remote device over a network. The remote device, equipped with its own processor, network interface, input device, and output device, receives the local performance, plays the backing track, and records a remote performance. The remote performance is then transmitted back to the original processor. The method enables real-time playback of the remote performance alongside the backing track, fostering seamless multi-party collaboration in music production.

20 Claims, 10 Drawing Sheets

(56) References Cited

U.S. PATENT DOCUMENTS

| | | |
|---|---|---|
| 11,616,589 B2 | 3/2023 | Galuten |
| 11,818,186 B2 | 11/2023 | Marchuk et al. |
| 2022/0141943 A1 | 5/2022 | Choi |
| 2022/0215819 A1 | 7/2022 | Palmer |
| 2023/0031866 A1 | 2/2023 | Hudson |

* cited by examiner

MULTI-PARTY COLLABORATION METHODS AND SYSTEMS

BACKGROUND

Players of musical instruments may play music together, whether for casual playing or collaborating to form a composition. Such playing may take the form of "jamming," wherein two or more players play together, in some situations, alternate soloing or riffing as the case may be. Similarly, multiple parties have sought to collaborate on other performing arts, such as dance (e.g., cultural dance, dance battles, or dance-offs), rap battles, orchestra, visual arts, and other performing arts. Approaches to such multi-party collaboration have conventionally included playing together, in-person, so that each player can hear or see the other players. Dance performances may include, for example, dance battles, wherein dancers may compete against or coordinate with each other to attempt to deliver a more impressive routine. Rap battles may include, for example, competitive or coordinated performances between rappers lyrically competing attempting to deliver a more impressive rap line.

Beyond in-person collaboration, conventional solutions for remote music collaboration have involved recording individual tracks separately and combining the same in post-production. Such a solution lacks spontaneity during collaborative processes. It is prohibitive of jamming, as the players are not able to hear or see the other players. Additionally, the use of multiple software applications and hardware setups can complicate the workflow and hinder the creative process for musicians and producers.

Remote collaboration has been attempted via telephony and internet communications, for example, using traditional telephony, voice-over-internet protocol (VoIP), or video calling, whereby players attempt to play together using such means of communications. However, such means of communications suffer from inherent and natural latency, delays, glitches, and bandwidth problems, which are readily apparent if users attempt to play music together. Such latency is subject to network latency, connection fluctuations, power fluctuations, and other sources of latency between the user's input and output devices.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

In some aspects, the techniques described herein relate to a method for multi-party collaboration, including: providing a processor, a network interface in electronic communication with the processor and configured to transmit and receive data over a network, an input device in electronic communication with the processor, and an output device in electronic communication with the processor; and using the processor: playing a backing track via the output device; recording a local performance via the input device; transmitting the local performance to a remote device via the network using the network interface, the remote device including a remote processor, a remote network interface in electronic communication with the remote processor and configured to transmit and receive data over the network, a remote input device in electronic communication with the remote processor, and a remote output device in electronic communication with the remote processor, wherein the remote device is configured to, using the remote processor: receive the local performance via the network using the remote network interface; play the backing track via the remote output device; play the local performance simultaneously with the backing track via the remote output device; record a remote performance via the remote input device; and transmit the remote performance to the processor via the network using the remote network interface; receiving the remote performance via the network using the network interface; and playing the remote performance simultaneously with the backing track via the output device.

In some aspects, the techniques described herein relate to a system for multi-party collaboration, including: a processor; a network interface in electronic communication with the processor and configured to transmit and receive data over a network; an input device in electronic communication with the processor; and an output device in electronic communication with the processor; wherein the processor is configured to: play a backing track via the output device; record a local performance via the input device; transmit the local performance to a remote device via the network using the network interface, the remote device including a remote processor, a remote network interface in electronic communication with the remote processor and configured to transmit and receive data over the network, a remote input device in electronic communication with the remote processor, and a remote output device in electronic communication with the remote processor, wherein the remote device is configured to, using the remote processor: receive the local performance via the network using the remote network interface; play the backing track via the remote output device; play the local performance simultaneously with the backing track via the remote output device; record a remote performance via the remote input device; and transmit the remote performance to the processor via the network using the remote network interface; receive the remote performance via the network using the network interface; and play the remote performance simultaneously with the backing track via the output device.

In some aspects, the techniques described herein relate to a tangible, non-transitory, computer-readable medium for multi-party collaboration, the tangible, non-transitory, computer-readable medium having instructions thereupon which when implemented by a processor in electronic communication with a network interface configured to transmit and receive data over a network, an input device, and an output device cause the processor to: play a backing track via the output device; record a local performance via the input device; transmit the local performance to a remote device via the network using the network interface, the remote device including a remote processor, a remote network interface in electronic communication with the remote processor and configured to transmit and receive data over the network, a remote input device in electronic communication with the remote processor, and a remote output device in electronic communication with the remote processor, wherein the remote device is configured to, using the remote processor: receive the local performance via the network using the remote network interface; play the backing track via the remote output device; play the local performance simultaneously with the backing track via the remote output device; record a remote performance via the remote input device; and transmit the remote performance to the processor via the network using the remote network interface; receive the remote performance via the network using the network interface; and play the remote performance simultaneously with the backing track via the output device.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

Figure 1A:
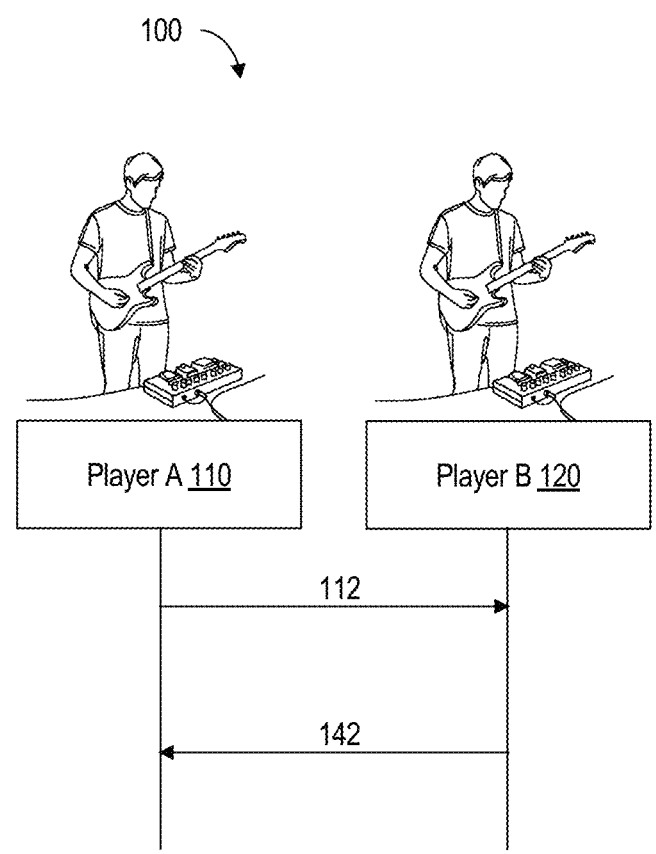
FIG. 1A illustrates a communications sequence of a system for multi-party collaboration, according to one or more of the implementations herein.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Implementations herein present methods, systems, and apparatuses for multiple parties to engage in collaborations that would otherwise be degraded if subject to computer network latencies. For example, parties could use methods, systems, or apparatuses disclosed herein to collaborate on performing arts such as music, dance (e.g., cultural dance, dance battles, or dance-offs), rap battles, visual arts, and other performing arts. Further, parties could use methods, systems, or apparatuses disclosed herein for other collaborations (e.g., file sharing and collaboration, telephony, communications, etc.) that would be degraded if subject to computer network latencies. While musical performing arts are described throughout, it will be understood that the methods, systems, and apparatuses disclosed herein can be readily applied to such other collaborations.

FIG. 1A illustrates a communications sequence of a system 100 for multi-party collaboration, according to one or more of the implementations herein. The system 100 illustrates two user devices, a device 110 and a device 120, utilized by users designated as a performer A and a performer B, respectively. It will be understood that the system 100 may be implemented with any plurality of devices and users, as will be readily understood when reading the present disclosure.

The device 110 and the device 120 may each include a processor, a network interface, and input device, and an output device. The network interfaces, the input devices, and the output devices may be in electronic communication with their respective processors. The network interface may be configured to transmit and receive data over a network (e.g., a wired network, a wireless network, the internet, a local area network, etc.).

Both the device 110 and the device 120 may, by their respective output devices, play a backing track. The backing track may be pre-recorded and/or pre-selected. In some implementations, specific stems or tracks may be selected or deselected at one or more of, or each, user's discretion to add, remove, or control the mix or levels of instruments or components of the backing track. For example, players may turn off output of certain instrumentation when listening to the backing track. In some implementations, the backing track is played from a local storage onboard the device 110 and/or the device 120. In other implementations, the backing track may be streamed from either of the device 110 or the device 120. The backing track may be played at the device 110 and the device 120 in a synchronized fashion based on, for example, a synchronized time. The backing track could vary depending on the activity the performers are engaging in, for example, a drumbeat, a click track, performance cues, instrumental rhythm, and others.

In some implementations, the backing track could be a silent backing track, producing no audible sound via the output devices but be played and, where applicable, dubbed over nonetheless. Such a backing track may be used to coordinate time between the performers and provide a base for dubbing.

Either or both of the device 110 and the device 120 may then be used to record a performance by the performer A and the performer B, respectively. In some implementations, recording a performance by performer A by the device 110 may be before recording a performance by performer B by the device 120. In further implementations, recording a performance by performer A by the device 110 may alternate with recording a performance by performer B by the device 120. In still further implementations, recording a performance by performer A by the device 110 may be simultaneous with recording a performance by performer B by the device 120.

The performance recorded at the device 110 may be transmitted in an operation 112 to the device 120. Once received by the device 120, or otherwise in due course, the performance recorded at the device 110 may be played by the device 120. Where a backing track is implemented, the performance may be played in a musically-synchronized fashion. In various implementations, the playback of the other device's performances may be simultaneous, alternating, or sequential.

In some implementations, an interlude may be employed to provide for ready-time for a performer and/or musical continuity and/or synchronization between the devices. The duration of such an interlude may, for example, be calculated based on a streaming latency between the device 110 and the device 120 and/or a performance continuity rule. Streaming latency may be determined by the device 110 and/or the device 120, for example, before the performers begin their first performance, the playing of an intro, or the playing of the backing track. Examples of performance continuity rules may include, for example, a rule aligning the starts of performers' performances, and the playbacks thereof based on a meter, progression, beat, tempo (e.g., of the performers' performances and/or the backing track) or other musical structure.

In some implementations, the backing track may include an intro segment and/or an outro segment. The durations of these segments may be determine based upon the latency and/or a performance continuity rule.

The times and/or second intervals (e.g., ticks) of the device 110 and the device 120 may be synchronized, or otherwise an offset may be measured for coordinating of at least one of the device 110 and the device 120, so that each of the device 110 and the device 120 can begin performance phases and playback phases at the same instant, or at a known offset. This synchronization or coordination may be accomplished using the backing track or a measure of network latency (e.g., ping), and/or synchronization with a common clock (e.g., internet time from a single source, cell service time, radio time, atomic clocks, etc.).

In some implementations, the device 110 and/or the device 120 may include an indicator as to when a performer is to begin playing, a connection status, a transmission status, a playing status of another performer, a number and/or location of other performers, a playback status, and/or other indications relevant to the collaboration. The indicator may be implemented as, for example a display element on a screen of a computing device; a light indicator; a vibrator (e.g. a motor vibrator device); or a sound emitted from the output device.

The performance recorded at the device 120 may be transmitted in an operation 142 to the device 110. Once received by the device 110, or otherwise in due course, the performance recorded at the device 120 may be played by the device 110.

Where backing tracks are implemented, the performances may be played in a musically-synchronized fashion with the backing track or otherwise in a pre-programmed sequence. For example, a backing track may include pre-designated segments for one or more of the performers to perform their performances. For example, the backing track may include designated segments, exhibiting, for example, change in instrumentation, decrease in volume, etc., during which a performer is designated to perform.

Figure 1B:
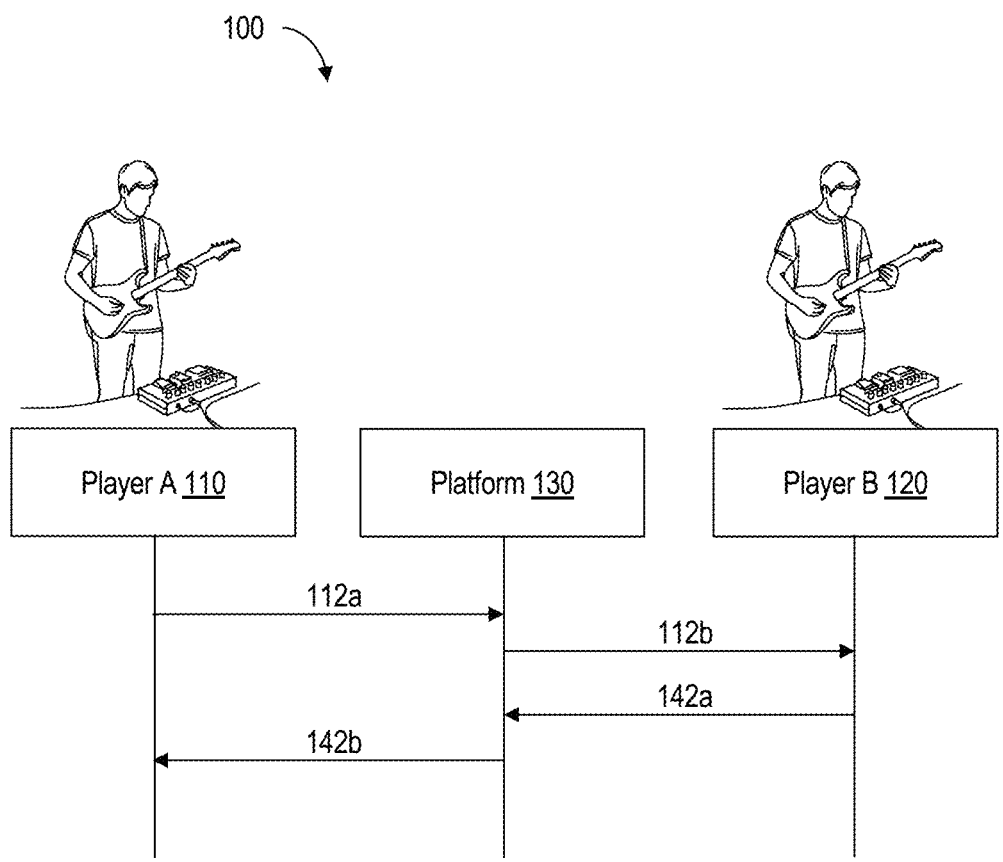
FIG. 1B illustrates an alternate communications sequence of the system of FIG. 1A implementing a platform for multi-party collaboration, according to one or more of the implementations herein.

FIG. 1B illustrates an alternate communications sequence of the system 100 of FIG. 1A implementing a platform 130 for multi-party collaboration, according to one or more of the implementations herein. In implementations of the system 100 such as that illustrated in FIG. 1B, a platform 130 may coordinate activities of and transmissions between the device 110 and the device 120. Such a platform 130 may be implemented as an application server, which may receive the performances at an operation 112a and an operation 142a and transmit the performances to the other device at an operation 112b and an operation 142b, respectively.

In such implementations, the platform 130 may perform a variety of functions in relation to the performances and the collaboration between the devices. For example, the platform 130 may: synchronize time between the device 110 and the device 120; distribute the backing track to the device 110 and the device 120; stream the backing track to the device 110 and the device 120; adjust and/or level audio received at the operation 112a and the operation 142; apply equalizer settings to audio received at the operation 112a and the operation 142; downsample or standardize a bitrate of audio received at the operation 112a and the operation 142; check credentials of users; store one or more components of or a composite of the performances; broadcast and/or stream one or more components of or a composite of the performances to the performers or to others (e.g., third-party viewers over the internet), and other functions.

In some implementations, a mode of operation of a system according to the present disclosure may provide for synchronized performing and playback by a plurality of performers. In such implementations, performers may engage in simultaneous performance phases and simultaneous playback phases during the collaboration.

For example, in a two-performer arrangement, each performer may record a performance, which may be streamed or otherwise transferred to the other performer. This transfer may, in some implementations, begin immediately once both performers begin performing so as to provide sufficient buffer that the other performer can begin playing the performance immediately upon conclusion of that performer's own performance.

In such a two-performer sequence, from the perspective of each performer, the performer may perform for a period, and then listen to the other performer's performance for an equal period. Such an implementation can be extended to more than two performers as well. Given n performers, each performer may, following their own performance, listen to n−1 streamed recordings representing each of the other performers' performances. The sequence may then repeat for as long as is desired by the performers collaborating, or otherwise defined by a set time or the length of a backing track.

Performance and playback may be coordinated by a backing track. Such a backing track may be played, for example, using an output device implemented as a speaker. Using a backing track starting at a synchronized time, the performers may be provided with means to ensure musical continuity as they play. For example, the performers may play over a "four on the floor" drumbeat backing track and thus coordinate their musical performance accordingly. As such, the synchronicity of the backing track between the performers and the streaming of each performers' performance to the other performer may provide for musical continuity as the performers play together.

Figure 2:
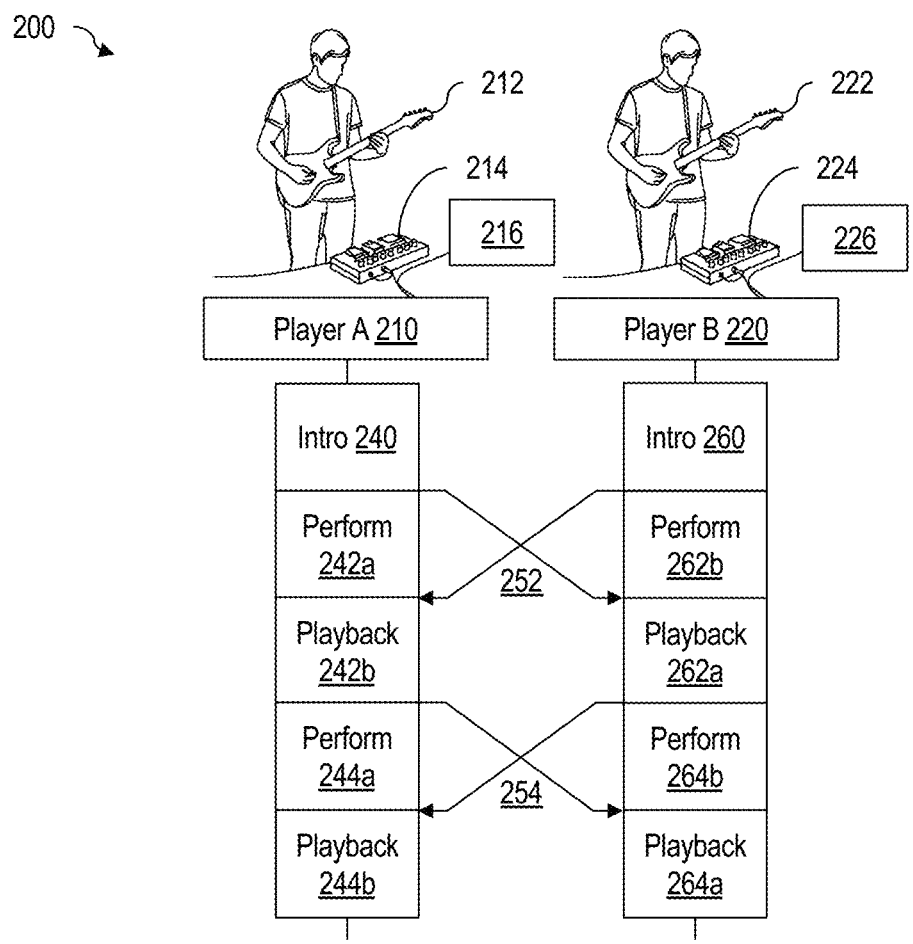
FIG. 2 is a sequence diagram of operation of an example system for multi-party collaboration, according to one or more of the implementations herein.

FIG. 2 is a sequence diagram of operation of an example system 200 for multi-party collaboration, according to one or more of the implementations herein. The system 200 may implement a mode of multi-party collaboration wherein a performer A and a performer B engage in performance and playback phases simultaneously. It will be understood that the system 200 may be implemented with any plurality of devices and users, as will be readily understood when reading the present disclosure.

Performer A may engage with a device 210. The device 210 may include any variety of devices a user may use in implementing the system 200, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 210 may be configured to receive input from, for example, an input device 214, which may itself receive input, for example, from a user interface device 212. While the user interface device 212 is illustrated as an instrument (e.g. a guitar) and the input device 214 is illustrated as a pedalboard, it will be understood that other forms of input devices may be used, for example, microphones, cameras, dance mats, MIDI devices, personal computers, etc. The user device 210 may be further configured to output to, for example, an output device 216, for example, a speaker or display. One or more of the input device 214, the user interface device 212, or the output device 216 may be integral with, within, or onboard the device 210.

Performer B may engage with a device 220. The device 220 may include any variety of devices a user may use in implementing the system 200, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 220 may be configured to receive input from, for example, an input device 224, which may itself receive input, for example, from a user interface device 222. While the user interface device 222 is illustrated as an instrument (e.g. a guitar) and the input device 224 is illustrated as a pedalboard, it will be understood that other forms of input devices may be used, for example, microphones, cameras, dance mats, etc. The user device 220 may be further configured to output to, for example, an output device 226, for example, a speaker or display. One or more of the input device 224, the user interface device 222, or the output device 226 may be integral with, within, or onboard the device 220.

The sequence may begin in some implementations with playing an introduction 240 at the device 210 and an introduction 260 at the device 220. The introduction 240 and the introduction 260 may be the same introduction and may be part of a backing track where a backing track is used. The duration of the introduction 240 and the introduction 260 may be determined by, for example, a user setting and/or a performance continuity rule.

Upon conclusion of the introduction 240 and the introduction 260, or otherwise at the start of a sequence lacking the introduction 240 or the introduction 260, the performers may begin their first performance phases to record their performances using their respective devices. Performer A may engage in a performance phase 242*a*, and performer B may engage in a performance phase 262*b*. At some point equal to or later than the start of the performance phase 242*a*, an exchange 252 may begin to transfer, buffer, and/or stream one or more of the performances to the other device via the network. The exchange may include the performance recorded by the device 210 during the performance phase 242*a* and/or the performance recorded by the device 220 during the performance phase 262*b*.

Once the performance phase 242*a* and the performance phase 262*b* are completed, the device 210 and the device 220 may have received (e.g., buffered) a sufficient portion of the performance received via the exchange 252 to being playback phases. As such, the device 210 may begin a playback 242*b* of the performance from the performance phase 262*b*, and the device 220 may begin a playback 262*a* of the performance from the performance phase 242*a*.

The performance-playback cycle may then repeat. Upon conclusion of the playback 242*b* and the playback 262*a*, the performers may begin their next performance phases to record their performances using their respective devices. Performer A may engage in a performance phase 244*a*, and performer B may engage in a performance phase 264*b*. At some point equal to or later than the start of the performance phase 244*a*, an exchange 254 may begin to transfer, buffer, and/or stream one or more of the performances to the other device via the network. The exchange may include the performance recorded by the device 210 during the performance phase 244*a* and/or the performance recorded by the device 220 during the performance phase 264*b*.

Once the performance phase 244*a* and the performance phase 264*b* are completed, the device 210 and the device 220 may have received (e.g., buffered) a sufficient portion of the performance received via the exchange 254 to being playback phases. As such, the device 210 may begin a playback 244*b* of the performance from the performance phase 264*b*, and the device 220 may begin a playback 264*a* of the performance from the performance phase 244*a*.

The performance-playback cycle may then repeat until the users are desirous to end it, the backing track ends, a duration has elapsed, or a time limit has elapsed.

In some implementations, multi-party collaboration according to implementations herein may be conducted in a same-order mode, where each performer would experience a performance-playback sequence where the performances and playbacks are in the same order for each performer. Such a mode may leverage interludes to allow performers to playback the other performers' performance(s) before their own performance begins. In some implementations, playback of the performance may be completed at each participating performer's location before the next performer's solo begins. In this way, the ordering of performances and playbacks may be the same for each performer in the collaboration. In implementations using a backing track, the various performances may be recorded over the backing track.

In such implementations, interludes may be utilized to gap-fill between the respective performance and playback phases of each performer in order to provide the experience of playing a single song (e.g., a single continuous song). While each performer may ultimately experience a different composite composition, each performer would nonetheless experience the same ordering of performances and playbacks. For example, in a two-performer collaboration with a performer A and a performer B, each performer may, including the phases where that performer is performing, experience the sequence of A, B, A, B, and so on. Similarly, in a three-performer collaboration with a performer A, a performer B, and a performer C, each performer may, including the phases where that performer is performing, experience the sequence of A, B, C, A, B, C, and so on. In this way, collaboration sequences may be implemented for 2–n performers.

To effect such performance-playback sequences, interludes may be interspersed between the performances and playbacks to allow for transfer, streaming and/or buffering of the next performance to be played back. The interlude duration may be determined or selected at the devices of the performers, or in implementations using a platform, the platform. The interlude may be calculated, for example, based on a measure length, staff length, a chosen period, a tempo, a latency between the devices (e.g., an average latency across all devices implemented), and/or a performance continuity rule. The interludes may be calculated to fit the performances and playbacks into an ordered sequence for each performer given such parameters, and as such, the different-length interludes may be used throughout the process. Where a backing track is used, the interlude may be a duration where the backing track continues to play, but no performance is made or played back.

For example, for two performers collaborating, there may be two interlude durations used to order the sequence for musical continuity. The interlude durations may be calculated from a unit interlude of duration t, where t is determined by a performance continuity rule (e.g., the length of a measure at the tempo to be played by the performers or the backing track) and a rest time k, where k is greater than or equal to zero. In some implementations, k may be required to be an integer multiple of t. Where each performer's performance phase, and thereby the playback phases of those performances, are equal, an interlude $I_a$ equal to k may be sequenced before a given performer performs in that performer's composition. A further interlude $I_c$ equal to 2t+k may be sequenced after a performer performs in that performer's composition.

Figure 3:
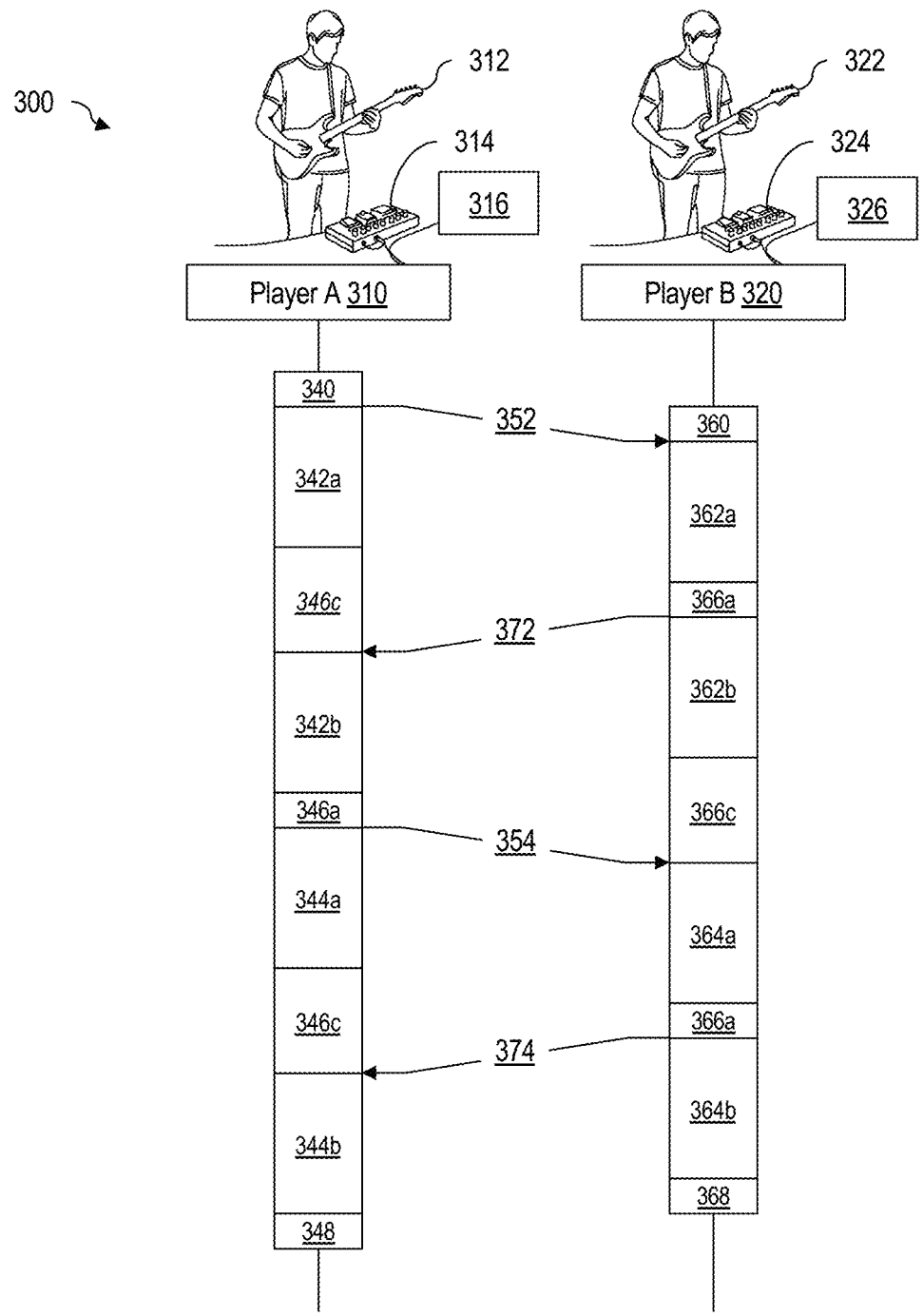
FIG. 3 is a sequence diagram of operation of an example system for multi-party collaboration, according to one or more of the implementations herein.

FIG. 3 is a sequence diagram of operation of an example system 300 for multi-party collaboration, according to one or more of the implementations herein. The system 300 may implement a mode of multi-party collaboration wherein three performers, a performer A and a performer B engage in performance and playback phases in a coordinated sequence. It will be understood that the system 300 may be implemented with any plurality of devices and users, as will be readily understood when reading the present disclosure.

Performer A may engage with a device 310. The device 310 may include any variety of devices a user may use in implementing the system 300, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 310 may be configured to receive input from, for example, an input device 314, which may itself receive input, for example, from a user interface device 312. While the user interface device 312 is illustrated as an instrument (e.g. a guitar) and the input device 314 is illustrated as a pedalboard, it will be understood that other forms of input devices may be used, for example, microphones, cameras, dance mats, etc. The user device 310 may be further configured to output to, for example, an output device 316, for example, a speaker or display. One or more of the input device 314, the user interface device 312, or the output device 316 may be integral with, within, or onboard the device 310.

Performer B may engage with a device 320. The device 320 may include any variety of devices a user may use in implementing the system 300, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 320 may be configured to receive input from, for example, an input device 324, which may itself receive input, for example, from a user interface device 322. While the user interface device 322 is illustrated as an instrument (e.g. a guitar) and the input device 324 is illustrated as a pedalboard, it will be understood that other forms of input devices may be used, for example, microphones, cameras, dance mats, etc. The user device 320 may be further configured to output to, for example, an output device 326, for example, a speaker or display. One or more of the input device 324, the user interface device 322, or the output device 326 may be integral with, within, or onboard the device 320.

Each performer's sequence may, in some implementations, begin with an introduction such as an intro 340 and an intro 360 effected by the device 310 and the device 320, respectively. The intro 340 and the intro 360 may be of equal durations or different durations depending on settings of the system, begin at different times or at a coordinated time, also depending on settings of the system. The intro 340 and the intro 360 may in varying implementations be of the same duration, or the durations may differ such that each device's sequence begins simultaneously.

Performer A may begin a performance phase 342a, where the performer records a performance. This performance may immediately upon start of the performance phase 342a or thereafter be transferred, streamed, and/or buffered in an exchange 352 over a network to the device 320, to be played by the device 320 in a playback phase 362a.

Upon conclusion of the performance phase 342a, the device 310 may effect an interlude 346c (e.g., of a duration $I_c$=2t+k, where t is a unit interlude duration determined by a performance continuity rule and k is a rest time greater than or equal to zero). Upon conclusion of the playback phase 362a, the device 320 may effect an interlude 366a (e.g., of a duration $I_a$=k).

Then, performer B may begin a performance phase 362b, where the performer records a performance. This performance may immediately upon start of the performance phase 362b or thereafter be transferred, streamed, and/or buffered in an exchange 372 over a network to the device 310, to be played by the device 310 in a playback phase 342b. Upon conclusion of the performance phase 362b, the device 320 may effect an interlude 366c (e.g., of a duration $I_c$). Upon conclusion of the playback phase 342b, the device 310 may effect an interlude 346a (e.g., of a duration $I_a$).

The performance-playback cycle may then repeat. Performer A may begin a performance phase 344a, where the performer records a performance. This performance may immediately upon start of the performance phase 344a or thereafter be transferred, streamed, and/or buffered in an exchange 354 over a network to the device 320, to be played by the device 320 in a playback phase 364a. Upon conclusion of the performance phase 344a, the device 310 may effect another interlude 346c (e.g., of a duration $I_c$). Upon conclusion of the playback phase 364a, the device 320 may effect another interlude 366a (e.g., of a duration $I_a$).

Then, performer B may begin a performance phase 364b, where the performer records a performance. This performance may immediately upon start of the performance phase 364b or thereafter be transferred, streamed, and/or buffered in an exchange 374 over a network to the device 310, to be played by the device 310 in a playback phase 344b. Upon conclusion of the performance phase 364b, the device 320 may effect another interlude 366c (e.g., of a duration $I_c$). Upon conclusion of the playback phase 344b, the device 310 may effect another interlude 346a (e.g., of a duration $I_a$).

The performance-playback cycle may then repeat until the users are desirous to end it, the backing track ends, a duration has elapsed, or a time limit has elapsed. After the performers' last performance or playback, as the case may be, an outro 348 in the case of the device 310 and an outro 368 in the case of the device 320 may be played by the respective devices. The outro 348 and the outro 368 may in varying implementations be of the same duration, or the durations may differ such that each device's sequence ends simultaneously.

It will be understood that this mode can be extended for collaboration by 2–n performers. For example, for n performers collaborating, there may be three interlude durations used to order the sequence for musical continuity. The interlude durations may be calculated from a unit interlude of duration t, where t is determined by a performance continuity rule (e.g., the length of a measure at the tempo to be played by the performers or the backing track) and a rest time k, where k is greater than or equal to zero. In some implementations, k may be required to be an integer multiple of t. Where each performer's performance phase, and thereby the playback phases of those performances, are equal, an interlude $I_a$ equal to k may be sequenced before a given performer performs in that performer's composition. A further interlude $I_c$ equal to 2t+k may be sequenced after a performer performs in that performer's composition. Further interludes $I_b$ equal to t+k may be sequenced between back-to-back playbacks of other performers' performances.

Figure 4:
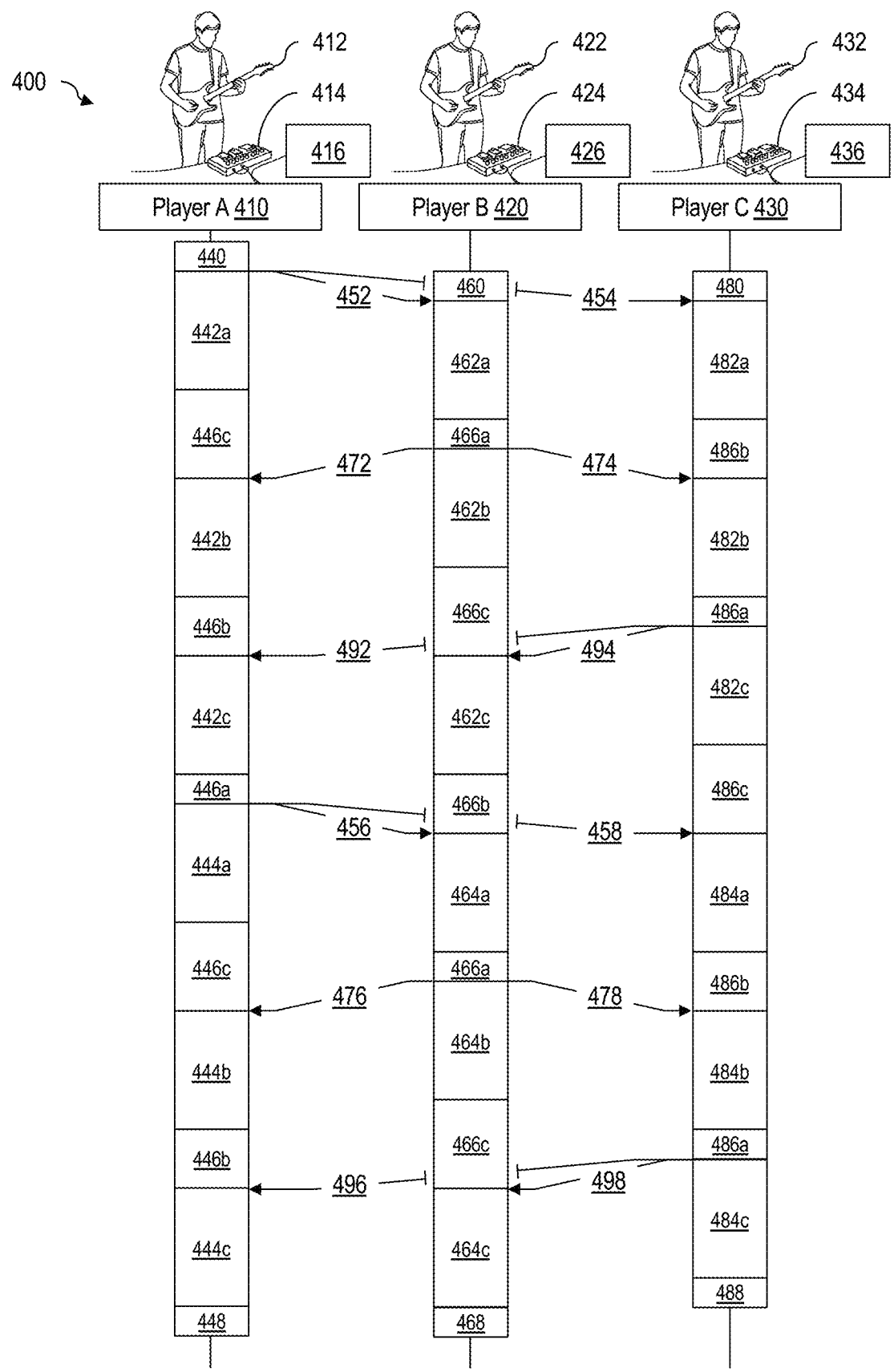
FIG. 4 is a sequence diagram of operation of an example system for multi-party collaboration, according to one or more of the implementations herein.

FIG. 4 is a sequence diagram of operation of an example system 400 for multi-party collaboration with, according to one or more of the implementations herein. The system 400 may implement a mode of multi-party collaboration wherein three performers, a performer A, a performer B, and a performer C engage in performance and playback phases in a coordinated sequence. It will be understood that the system 400 may be implemented with any plurality of devices and users, as will be readily understood when reading the present disclosure.

Performer A may engage with a device 410. The device 410 may include any variety of devices a user may use in implementing the system 400, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 410 may be configured to receive input from, for example, an input device 414, which may itself receive input, for example, from a user interface device 412. While the user interface device 412 is illustrated as an instrument (e.g. a guitar) and the input device 414 is illustrated as a pedalboard, it will be understood that other forms of input devices may be used, for example, microphones, cameras, dance mats, etc. The user device 410 may be further configured to output to, for example, an output device 416, for example, a speaker or display. One or more of the input device 414, the user interface device 412, or the output device 416 may be integral with, within, or onboard the device 410.

Performer B may engage with a device 420. The device 420 may include any variety of devices a user may use in implementing the system 400, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 420 may be configured to receive input from, for example, an input device 424, which may itself receive input, for example, from a user interface device 422. While the user interface device 422 is illustrated as an instrument (e.g. a guitar) and the input device 424 is illustrated as a pedalboard, it will be understood that other forms of input devices may be used, for example, microphones, cameras, dance mats, etc. The user device 420 may be further configured to output to, for example, an output device 426, for example, a speaker or display. One or more of the input device 424, the user interface device 422, or the output device 426 may be integral with, within, or onboard the device 420.

Performer C may engage with a device 430. The device 430 may include any variety of devices a user may use in implementing the system 400, including, for example, a server, a desktop computer, a laptop computer, a handheld computer, a tablet computing platform, a Netbook, a Smartphone, a gaming console, a guitar pedalboard, an effects pedal, a dance mat, a microphone, a video camera, and/or other computing platforms. The device 430 may be configured to receive input from, for example, an input device 434, which may itself receive input, for example, from a user interface device 432. While the user interface device 432 is illustrated as an instrument (e.g. a guitar) and the input device 434 is illustrated as a pedalboard, it will be understood that other forms of input devices may be used, for example, microphones, cameras, dance mats, etc. The user device 430 may be further configured to output to, for example, an output device 436, for example, a speaker or display. One or more of the input device 434, the user interface device 432, or the output device 436 may be integral with, within, or onboard the device 430.

Each performer's sequence may, in some implementations, begin with an introduction such as an intro 440, an intro 460, and an intro 480 effected by the device 410, the device 420, and the device 430, respectively. The intro 440, the intro 460, and the intro 480 may be of equal durations or different durations depending on settings of the system, begin at different times or at a coordinated time, also depending on settings of the system. The intro 440, the intro 460, and the intro 480 may in varying implementations be of the same duration, or the durations may differ such that each device's sequence begins simultaneously.

Performer A may begin a performance phase 442a, where the performer records a performance. This performance may immediately upon start of the performance phase 442a or thereafter be transferred, streamed, and/or buffered in an exchange 452 over a network to the device 420, to be played by the device 420 in a playback phase 462a, and an exchange 454 over a network to the device 430, to be played by the device 430 in a playback phase 482a. Upon conclusion of the performance phase 442a, the device 410 may effect an interlude 446c (e.g., of a duration $I_c$=2t+k, where t is a unit interlude duration determined by a performance continuity rule and k is a rest time greater than or equal to zero). Upon conclusion of the playback phase 462a, the device 420 may effect an interlude 466a (e.g., of a duration $I_a$=k). Upon conclusion of the playback phase 482a, the device 430 may effect an interlude 486b (e.g., of a duration $I_b$=t+k).

Then, performer B may begin a performance phase 462b, where the performer records a performance. This performance may immediately upon start of the performance phase 462b or thereafter be transferred, streamed, and/or buffered in an exchange 472 over a network to the device 410, to be played by the device 410 in a playback phase 442b, and an exchange 474 over a network to the device 430, to be played by the device 430 in a playback phase 482b. Upon conclusion of the performance phase 462b, the device 420 may effect an interlude 466c (e.g., of a duration $I_c$). Upon conclusion of the playback phase 442b, the device 410 may effect an interlude 446b (e.g., of a duration $I_b$). Upon conclusion of the playback phase 482b, the device 430 may effect an interlude 486a (e.g., of a duration $I_a$).

Then, performer C may begin a performance phase 482c, where the performer records a performance. This performance may immediately upon start of the performance phase 482c or thereafter be transferred, streamed, and/or buffered in an exchange 492 over a network to the device 410, to be played by the device 410 in a playback phase 442c, and an exchange 494 over a network to the device 420, to be played by the device 420 in a playback phase 462c. Upon conclusion of the performance phase 482c, the device 430 may effect an interlude 486c (e.g., of a duration $I_c$). Upon conclusion of the playback phase 442c, the device 410 may effect an interlude 446a (e.g., of a duration $I_a$). Upon conclusion of the playback phase 462c, the device 430 may effect an interlude 466b (e.g., of a duration $I_b$).

The performance-playback cycle may then repeat. Performer A may begin a subsequent performance phase 444a, where the performer records a subsequent performance. This performance may immediately upon start of the performance phase 444a or thereafter be transferred, streamed, and/or buffered in an exchange 456 over a network to the device 420, to be played by the device 420 in a playback phase 464a, and an exchange 458 over a network to the device 430, to be played by the device 430 in a playback phase 484a. Upon conclusion of the performance phase 444a, the device 410 may effect an interlude 446c (e.g., of a duration $I_c$). Upon conclusion of the playback phase 464a, the device 420 may effect an interlude 466a (e.g., of a duration $I_a$). Upon conclusion of the playback phase 484a, the device 430 may effect an interlude 486b (e.g., of a duration $I_b$).

Then, performer B may begin a subsequent performance phase 464b, where the performer records a subsequent performance. This performance may immediately upon start of the performance phase 464b or thereafter be transferred, streamed, and/or buffered in an exchange 476 over a network to the device 410, to be played by the device 410 in a playback phase 444b, and an exchange 478 over a network to the device 430, to be played by the device 430 in a playback phase 484b. Upon conclusion of the performance phase 464b, the device 420 may effect an interlude 466c (e.g., of a duration $I_c$). Upon conclusion of the playback phase 444b, the device 410 may effect an interlude 446b (e.g., of a duration $I_b$). Upon conclusion of the playback phase 484b, the device 430 may effect an interlude 486a (e.g., of a duration $I_a$).

Then, performer C may begin a subsequent performance phase 484c, where the performer records a subsequent performance. This performance may immediately upon start of the performance phase 484c or thereafter be transferred, streamed, and/or buffered in an exchange 496 over a network to the device 410, to be played by the device 410 in a playback phase 444c, and an exchange 498 over a network to the device 420, to be played by the device 420 in a playback phase 464c. Upon conclusion of the performance phase 484c, the process may repeat, for example, the device 430 may effect an interlude 486c (e.g., of a duration $I_c$). Upon conclusion of the playback phase 444c, the device 410 may effect an interlude 446a (e.g., of a duration $I_a$). Upon conclusion of the playback phase 464c, the device 430 may effect an interlude 466b (e.g., of a duration $I_b$), and so on and so forth. If the performance phase 484c is the final performance phase (or otherwise a performance by performer A or performer B is the final performance phase), the cycle may proceed to outros.

The performance-playback cycle may then repeat until the users are desirous to end it, the backing track ends, a duration has elapsed, or a time limit has elapsed. After the performers' last performance or playback, as the case may be, an outro 448 in the case of the device 410, an outro 468 in the case of the device 420, and an outro 488 in the case of the device 430 may be played by the respective devices. The outro 448, the outro 468, and the outro 488 may in varying implementations be of the same duration, or the durations may differ such that each device's sequence ends simultaneously.

Figure 5:
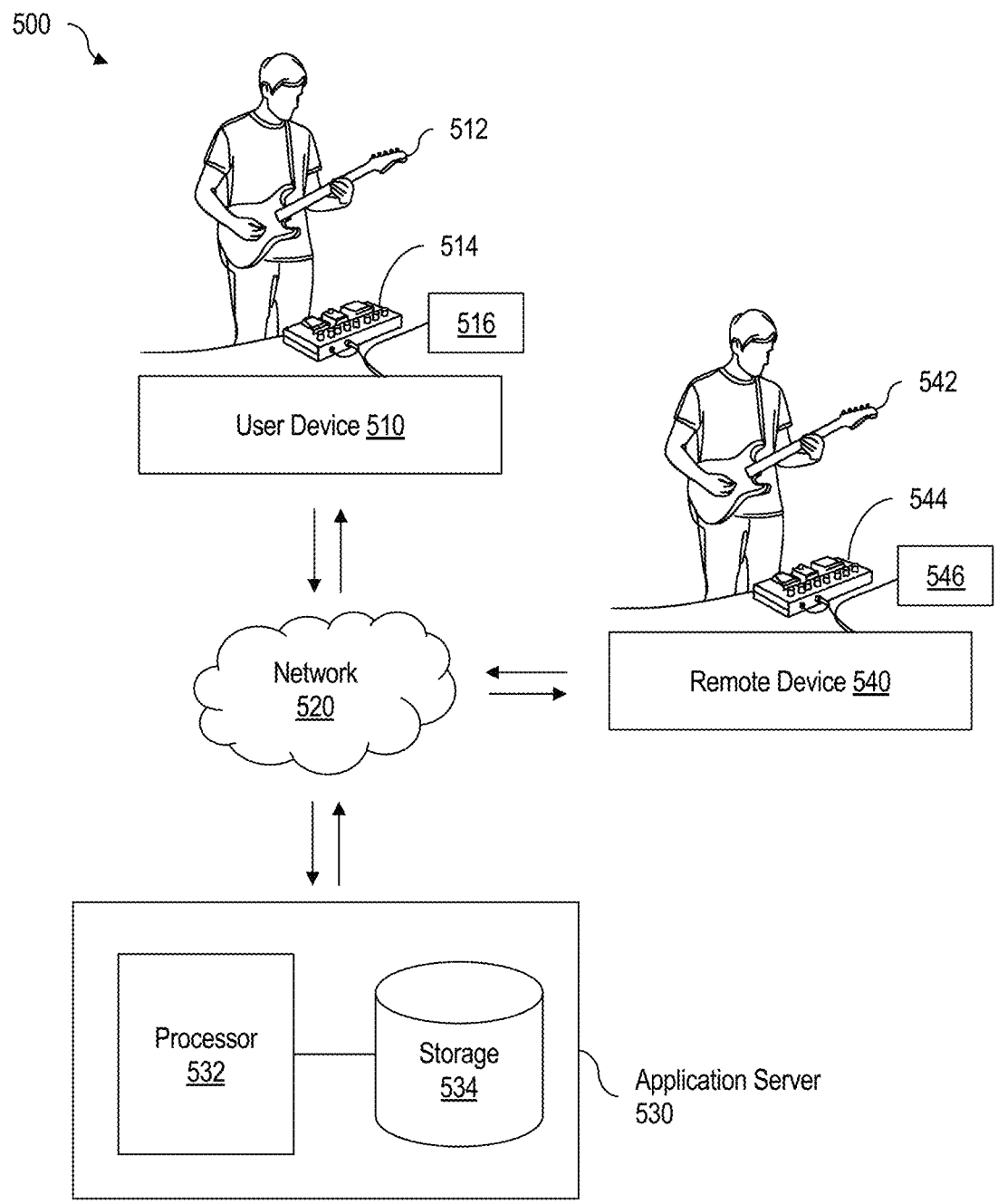
FIG. 5 illustrates an operational environment, according to one or more of the implementations herein.

FIG. 5 illustrates an operational environment of a system 500, according to one or more of the implementations herein. As illustrated in FIG. 5, the operational environment of the system 500 may include actors, including a user device 510, a network 520, an application server 530 having at least a processor 532 and a storage 534, and a remote device 540.

The user device 510 may include any variety of devices a user may use to interface with the application server 530 via the network 520, including, for example, a server, a desktop computer, a laptop computer, a handheld computer, a tablet computing platform, a Netbook, a Smartphone, a gaming console, and/or other computing platforms. The user device 510 may be configured to receive input from, for example, an input device 514, which may itself receive input, for example, from a user interface device 512. While the user interface device 512 is illustrated as an instrument (e.g. a guitar) and the input device 514 is illustrated as a pedalboard, it will be understood that other forms of input devices may be used, for example, microphones, cameras, etc. The user device 510 may be further configured to output to, for example, an output device 516, for example, a speaker or display. One or more of the input device 514, the user interface device 512, or the output device 516 may be integral with, within, or onboard the user device 510. The user device 510 may be an implementation of or otherwise similar to one or more of the devices 110, 120, 210, 220, 310, 320, 410, 420, or 430.

The network 520 may include any variety of devices configured to enable a device to communicate with other devices, such as via a wired connection and/or a wireless connection, for example, via the internet and/or other networks using, for example, TCP/IP or cellular hardware enabling wired or wireless (e.g., cellular, 2G, 3G, 4G, 4G LTE, 5G, or wireless local area network) communication. For example, the network 520 may include, for example, a receiver, a transmitter, a transceiver, a modem, a network interface card, and/or an antenna.

The application server 530 may include any variety of devices configurable to perform the implementations and methods disclosed herein and interface with the user device 510 via the network 520, including, for example, a server, a desktop computer, a laptop computer, a handheld computer, a tablet computing platform, a Netbook, a Smartphone, a gaming console, and/or other computing platforms. The application server 530 may be similar to, for example, the platform 130.

The application server 530 may include the processor 532. The processor 532 may include, for example, one or more processor(s) configured to execute machine-readable instructions for implementing all or some of the implementations herein. The processor 532 may be configured to access the storage 534 to retrieve and/or write electronic data from and to the storage 534.

The application server 530 may include the storage 534. The storage 534 may be configured to electronically store data (e.g., host) corresponding to one or more databases or other forms of data storage for use in implementations herein. The storage 534 may be accessible by the processor 532.

It will be understood that, in some implementations, the user device 510 and the remote device 540 may be configured to communicate with each other directly via the network 520, omitting the application server 530 from the system 500 and performing the relevant processing via a processor similar to the processor 532 onboard the user device 510 and/or the remote device 540 and/or an electronic storage similar to the electronic storage 534 onboard the user device 510 and/or the remote device 540.

The remote device 540 may include any variety of devices a user may use to interface with the application server 530 via the network 520, including, for example, a server, a desktop computer, a laptop computer, a handheld computer, a tablet computing platform, a Netbook, a Smartphone, a gaming console, and/or other computing platforms. The remote device 540 may be configured to receive input from, for example, an input device 544, which may itself receive input, for example, from an interface device 544. While the remote user interface device 542 is illustrated as an instrument (e.g. a guitar) and the input device 544 is illustrated as a pedalboard, it will be understood that other forms of input devices may be used, for example, microphones, cameras, etc. The remote device 540 may be further configured to output to, for example, an output device 516, for example, a speaker (e.g., a single speaker, multiple speakers, or a speaker array) or display. One or more of the input device 544, the remote user interface device 542, or the output device 546 may be integral with, within, or onboard the remote device 540. The remote device 540 may be an implementation of or otherwise similar to one or more of the devices 110, 120, 210, 220, 310, 320, 410, 420, or 430.

A display may include a device (or "hardware component") that displays "display data" to form an image or images, such as, but not limited to, a picture, text, a desktop background, a gaming background, a video, an application window etc. One example of a display may include an integrated display as found in electronic devices such as handheld computing devices, electronic book readers, mobile telephones (smartphones), personal-digital-assistants (PDAs), wearable devices (smart-watches, smart-glasses, etc.). A display may employ any appropriate display technology, such as for example, LCD flat panel, LED flat panel, flexible-panels, etc., and may include other display hardware that may, as needed for a particular electronic device, be operatively coupled to other devices and components. Therefore, the display may include display hardware such as, but not limited to, a frame buffer, hardware display drivers, etc. that store and refresh display data to be displayed by the display. Also, the display may include integrated hardware for implementation of touchscreen functionality such that the display is operative to receive user input by touch or via a stylus.

Figure 6:
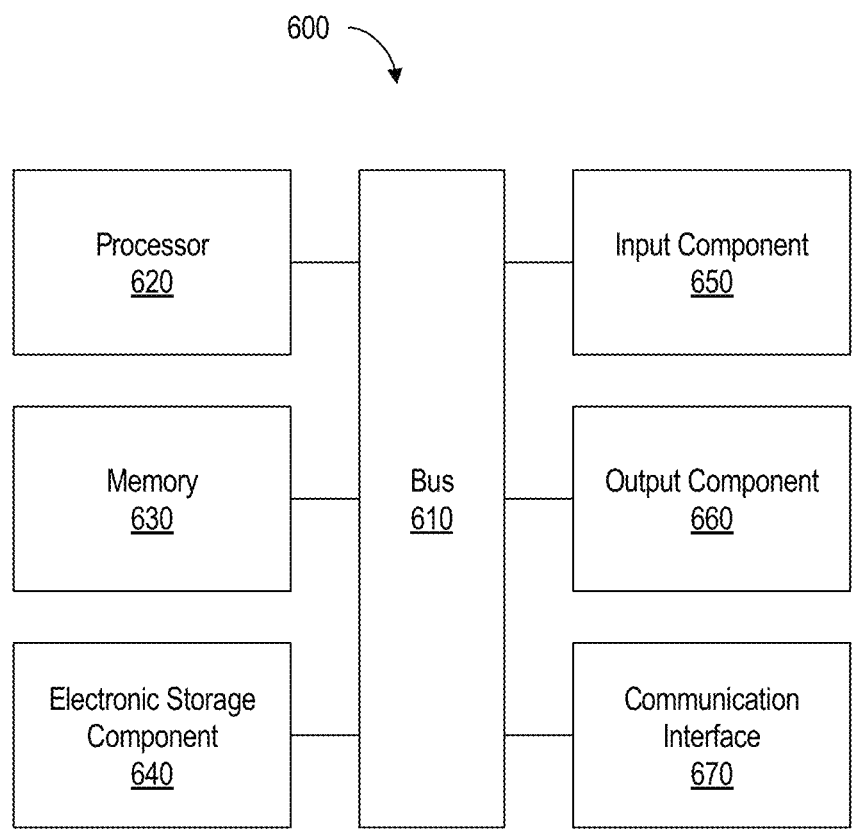
FIG. 6 is a diagram of example components of a device, according to one or more implementations herein.

FIG. 6 is a diagram of example components of a device 600, according to one or more implementations herein. The device 600 may correspond to one or more device, network, resource, or service of FIG. 1A to FIG. 6. In some implementations, one or more device, network, resource, or service of FIG. 5 may include one or more of the devices 600 and/or one or more components of the device 600, for example, according to a client/server architecture, a peer-to-peer architecture, and/or other architectures, which may include a plurality of hardware, software, and/or firmware components operating together to provide the functionality attributed herein to the device 600. In some implementations, the device 600 may include a distributed computing architecture (e.g., one or more individual computing platforms operating in concert to accomplish a computing task). For example, the device 600 may be implemented by a cloud of computing platforms operating together as the device 600. By way of non-limiting example, a given device 600 may include one or more of a server, a desktop computer, a laptop computer, a handheld computer, a tablet computing platform, a Netbook, a Smartphone, a gaming console, and/or other computing platforms.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

The device 600 may include a bus 610, a processor 620, a memory 630, a storage component 640, an input component 650, an output component 660, and a communication component 670.

The bus 610 includes a component that enables wired and/or wireless communication among the components of device 600. The bus 610 may enable various components of a computer system to communicate with each other, allowing for the transfer of data from one part to another.

The processor 620 may include a central processing unit, a graphics processing unit, a microprocessor, a controller, a microcontroller, a digital signal processor, a field-programmable gate array (FPGA), an application-specific integrated circuit, and/or another type of processing component. The processor 620 may be implemented in hardware, firmware, or a combination of hardware and software. In some implementations, the processor 620 may include one or more processors capable of being programmed to perform a function. Such processors may or may not be all integral to the same physical device and may in some embodiments be distributed among several devices.

The processor 620 may be configured to execute one or more of the modules disclosed herein, and/or other modules by software; hardware; firmware; some combination of software, hardware, and/or firmware; and/or other mechanisms for configuring processing capabilities on the processor 620. As used herein, the term "module" may refer to any component or set of components that perform the functionality attributed to the module. This may include one or more physical processors during execution of processor readable instructions, the processor readable instructions, circuitry, hardware, storage media, or any other components. Various modules or portions thereof may be implemented in any of various ways, including procedure-based techniques, component-based techniques, and/or object-oriented techniques, among others. For example, the program instructions may be implemented using system libraries, language libraries, model-view-controller (MVC) principles, application programming interfaces (APIs), large language models (LLMs), system-specific programming languages and principles, cross-platform programming languages and principles, pre-compiled programming languages, markup programming languages, stylesheet languages, "bytecode" programming languages, object-oriented programming principles or languages, other programming principles or languages, C, C++, C#, Java, JavaScript, Python, PHP, HTML, CSS, TypeScript, R, Elm, Unity, VB.Net, Visual Basic, Swift, Objective-C, Perl, Ruby, Go, SQL, Haskell, Scala, Arduino, assembly language, Microsoft Foundation Classes (MFC), Streaming SIMD Extension (SSE), or other technologies or methodologies, as desired.

It should be appreciated that although some modules disclosed herein may be illustrated for example as being implemented within a single processing unit, in embodiments in which the processor 620 includes multiple processing units, one or more of modules disclosed herein may be implemented remotely from the other modules. The description of the functionality provided by the different modules disclosed herein is for illustrative purposes, and is not intended to be limiting, as any of modules described herein may provide more or less functionality than is described. For example, one or more of modules disclosed herein may be eliminated, and some or all of its functionality may be provided by other ones of modules disclosed herein. As another example, the processor 620 may be configured to execute one or more additional modules that may perform some or all of the functionality attributed herein to one of modules disclosed herein.

The memory 630 may include a random-access memory, a read only memory, and/or another type of memory (e.g., a flash memory, a magnetic memory, and/or an optical memory).

The electronic storage component 640 may store information and/or software related to the operation of the device 600. For example, the electronic storage component 640 may include a solid-state disk drive, a hard disk drive, a magnetic disk drive, an optical disk drive, a compact disc, a digital versatile disc, and/or another type of non-transitory computer-readable medium. Implementations of the electronic storage component 640 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Implementations of the electronic storage component 640 may include one or both of system storage provided integrally (i.e., substantially non-removable) to the device 600 and/or removable storage that is removably connectable to the device 600 via, for example, a port (e.g., a serial port, a USB port, an IEEE 1394 port, a THUNDERBOLT™ port, etc.) or a drive (e.g., disk drive, flash drive, or solid-state drive etc.). The electronic storage component 640 may also or alternatively include one or more virtual storage resources (e.g., cloud storage, a virtual private network, and/or other virtual storage resources). An electronic storage may store software algorithms, information determined by one or more processors, information received from one or more computing platforms, information received from one or more remote platforms, databases (e.g., structured query language (SQL) databases (e.g., MYSQL®, MARIADB®, MONGODB®), NO-SQL databases, among others), data files, compiled data, analyzed data, charts, tables, videos, images, presentations, and 3D content in the respective format and/or other information enabling a computing platform to function as described herein.

The input component 650 may enable the device 600 to receive input, such as user input and/or sensed inputs. For example, the input component 650 may include a touch screen, a keyboard, a keypad, a mouse, a button, a microphone, a switch, a sensor (internal and/or external), a global positioning system component, an accelerometer, a gyroscope, and/or an actuator.

The output component 660 may enable the device 600 to provide output, such as via a display, a speaker, and/or one or more light-emitting diodes.

The communication component 670 may enable the device 600 to communicate with other devices, such as via a wired connection and/or a wireless connection, for example, via the internet and/or other networks using, for example, TCP/IP or cellular hardware enabling wired or wireless (e.g., cellular, 2G, 3G, 4G, 4G LTE, 5G, wireless local area network, near field communication (NFC), BLUETOOTH®) communication. For example, the communication component 670 may include a receiver, a transmitter, a transceiver, a modem, a network interface card, and/or an antenna.

As used herein, "internet" may include an interconnected network of systems and a suite of protocols for the end-to-end transfer of data therebetween. A model describing may be the Transport Control Protocol and Internet Protocol (TCP/IP), which may also be referred to as the internet protocol suite. TCP/IP provides a model of four layers of abstraction: an application layer, a transport layer, an internet layer, and a link layer. The link layer may include hosts accessible without traversing a router, and thus may be determined by the configuration of the network (e.g., a hardware network implementation, a local area network, a virtual private network, or a networking tunnel). The link layer may be used to move packets of data between the internet layer interfaces of different hosts on the same link. The link layer may interface with hardware for end-to-end transmission of data. The internet layer may include the exchange of datagrams across network boundaries (e.g., from a source network to a destination network), which may be referred to as routing, and is performed using host addressing and identification over an internet protocol (IP) addressing system (e.g., IPv4, IPv6). A datagram may include a self-contained, independent, basic unit of data, including a header (e.g., including a source address, a destination address, and a type) and a payload (e.g., the data to be transported), to be transferred across a packet-switched network. The transport layer may utilize the user datagram protocol (UDP) to provide for basic data channels (e.g., via network ports) usable by applications for data exchange by establishing end-to-end, host-to-host connectivity independent of any underlying network or structure of user data. The application layer may include various user and support protocols used by applications users may use to create and exchange data, utilize services, or provide services over network connections established by the lower layers, including, for example, routing protocols, the hypertext transfer protocol (HTTP), the file transfer protocol (FTP), the simple mail transfer protocol (SMTP), and the dynamic host configuration protocol (DHCP). Such data creation and exchange in the application layer may utilize, for example, a client-server model or a peer-to-peer networking model. Data from the application layer may be encapsulated into UDP datagrams or TCP streams for interfacing with the transport layer, which may then effectuate data transfer via the lower layers.

The communication component 670 may further implement an internet-of-things ("IoT") configuration, which may include a network of physical objects-devices, vehicles, buildings, and other items-embedded with electronics, software, sensors, and network connectivity that enables these objects to collect and exchange data via the Internet. Each IoT product/device may be an endpoint device having its own Internet address (e.g., IPv4, IPv6 address). The IoT allows objects to be sensed and controlled remotely across an existing network infrastructure (e.g., the Internet), creating opportunities for more direct integration of the physical world into computer-based systems.

The device 600 may perform one or more processes described herein. For example, a non-transitory computer-readable medium (e.g., the memory 630 and/or the storage component 640) may store a set of instructions (e.g., one or more instructions, code, software code, and/or program code) for execution by the processor 620. The processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

In addition to the example configuration described herein in FIG. 6, various steps, functions, and/or operations of the device 600 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link.

Figure 7:
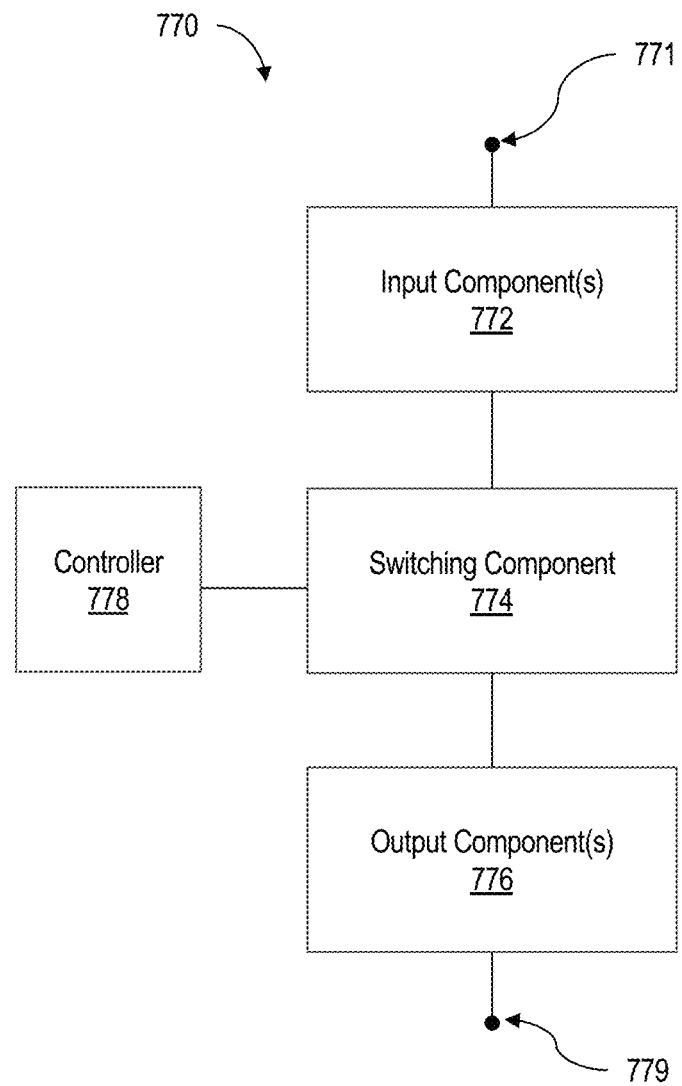
FIG. 7 is a diagram of example components of a device, according to one or more implementations herein.

FIG. 7 is a diagram of example components of a device 770, according to one or more implementations herein. The device 770 may correspond to the communication component 670 or another device or component illustrated in FIG. 5 or FIG. 6. In some implementations, the communication component 670 or another device or component illustrated in FIG. 1A to FIG. 6 may include one or more of the devices 770 and/or one or more components of the device 770. As shown in FIG. 7, the device 770 may include one or more input components 772 (herein referred to collectively as the input components 772 or individually as the input component 772), a switching component 774, one or more output components 776 (herein referred to collectively as the output components 776 or individually as the output component 776), and a controller 778.

The input component 772 may be one or more points of attachment for one or more input physical links 771 (herein referred to collectively as the input physical links 771 or individually as the input physical link 771) and include one or more points of entry for incoming traffic, such as packets. The input component 772 may process incoming traffic, such as by performing data link layer encapsulation or decapsulation. In some implementations, the input component 772 may transmit and/or receive packets. In some implementations, the input component 772 may include an input line card that includes one or more packet processing components (e.g., in the form of integrated circuits), such as one or more interface cards (IFCs), packet forwarding components, line card controller components, input ports, processors, memories, and/or input queues. In some implementations, the device 770 may include one or more the input components 772.

The switching component 774 may interconnect the input components 772 with the output components 776. In some implementations, the switching component 774 may be implemented via one or more crossbars, via busses, and/or with shared memories. The shared memories may act as temporary buffers to store packets from the input components 772 before the packets are eventually scheduled for delivery to the output components 776. In some implementations, the switching component 774 may enable the input components 772, the output components 776, and/or the controller 778 to communicate with one another.

The output component 776 may store packets and may schedule packets for transmission on the output physical link(s) 779 (herein referred to collectively as the output physical links 779 or individually as the output physical link 779). The output component 776 may support data link layer encapsulation or decapsulation, and/or a variety of higher-level protocols. In some implementations, the output component 776 may transmit packets and/or receive packets. In some implementations, the output component 776 may include an output line card that includes one or more packet processing components (e.g., in the form of integrated circuits), such as one or more IFCs, packet forwarding components, line card controller components, output ports, processors, memories, and/or output queues. In some implementations, the device 770 may include one or more output components 776. In some implementations, the input component 772 and the output component 776 may be implemented by the same set of components (e.g., an input/output component may be a combination of the input component 772 and the output component 776).

The controller 778 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 778 may include one or more processors that can be programmed to perform a function.

In some implementations, the controller 778 may include a RAM, a ROM, and/or another type of dynamic or static storage device (e.g., a flash memory, a magnetic memory, an optical memory, etc.) that stores information and/or instructions for use by the controller 778.

In some implementations, the controller 778 may communicate with other devices, networks, and/or systems connected to the device 770 to exchange information regarding network topology. The controller 778 may create routing tables based on the network topology information, may create forwarding tables based on the routing tables, and may forward the forwarding tables to the input components 772 and/or the output components 776. The input components 772 and/or the output components 776 may use the forwarding tables to perform route lookups for incoming and/or outgoing packets.

The controller 778 may perform one or more processes described herein. The controller 778 may perform these processes in response to executing software instructions stored by a non-transitory computer-readable medium. A computer-readable medium is defined herein as a non-transitory (e.g., the medium itself (i.e., tangible, not a signal) as opposed to a limitation on data storage persistency (e.g., RAM vs. ROM)) memory device. A memory device includes memory space within a single physical storage device or memory space spread across multiple physical storage devices.

Software instructions may be read into a memory and/or storage component associated with the controller 778 from another computer-readable medium or from another device via a communication interface. When executed, software instructions stored in a memory and/or storage component associated with the controller 778 may cause the controller 778 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, the device 770 may include additional components, fewer components, different components, or differently arranged components than those shown in FIG. 7. Additionally, or alternatively, a set of components (e.g., one or more components) of the device 770 may perform one or more functions described as being performed by another set of components of the device 770.

Figure 8:
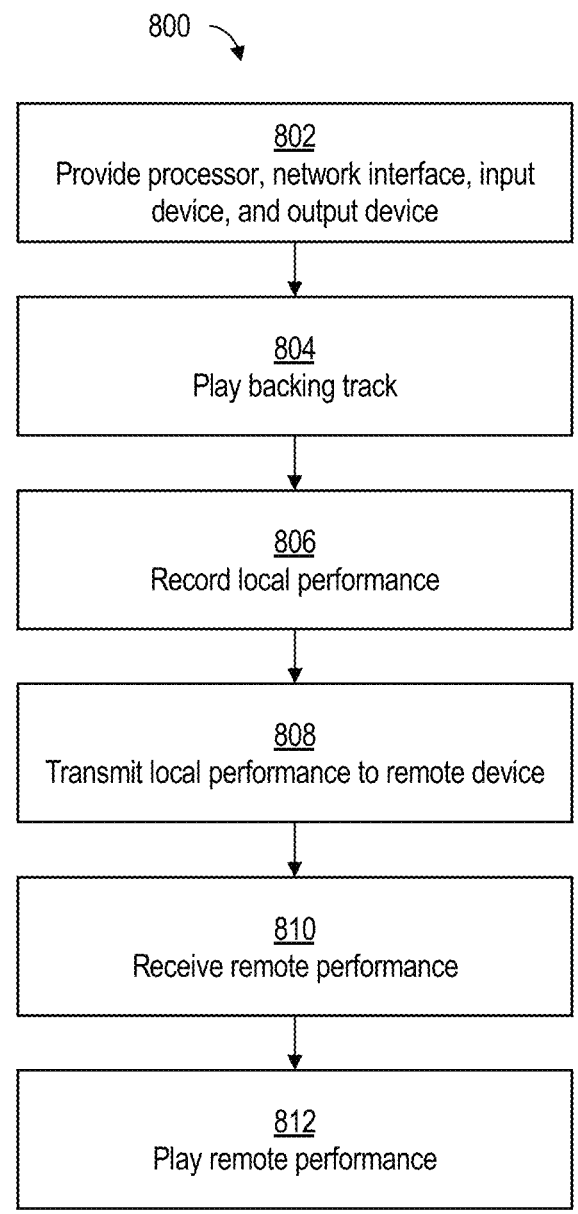
FIG. 8 is a flowchart illustrating an example method for multi-party collaboration, according to one or more implementations herein.

FIG. 8 is a flowchart illustrating an example method 800 for multi-party collaboration, according to one or more implementations herein. In some implementations, one or more operations may be performed by a one or more of the devices of FIG. 1A through FIG. 7. In some implementations, one or more operations may be performed by another device or system or group of devices or systems separate from or including these. Additionally, or alternatively other devices, components, or systems, may be employed to perform the operations.

An operation 802 may include providing a processor, a network interface in electronic communication with the processor and configured to transmit and receive data over a network, an input device in electronic communication with the processor, and an output device in electronic communication with the processor and may be performed alone or in combination with one or more other operations depicted in FIG. 8. A streaming latency may be determined between the processor and the remote processor. The duration of an interlude may be set based on the streaming latency and a performance continuity rule. The performance continuity rule may include a tempo of the backing track, and the duration is equal to a maximum of the streaming latency and a multiple of the tempo.

An operation 804 may include, using the processor, playing a backing track via the output device, and may be performed alone or in combination with one or more other operations depicted in FIG. 8. The backing track may include, for example, an introduction segment. Playing the backing track via the output device may comprise playing the introduction segment via the output device prior to the recording the local performance. The backing track may be selected prior to its playing.

In some implementations, the backing track may include a local performance segment and a remote performance segment, and the playing the backing track via the output device may comprise playing the local performance segment of the backing track simultaneously with the recording the local performance and the playing the backing track via the remote output device comprises playing the remote performance segment of the backing track simultaneously with the recording the remote performance.

An operation 806 may include, using the processor, recording a local performance via the input device, and may be performed alone or in combination with one or more other operations depicted in FIG. 8.

An operation 808 may include, using the processor, transmitting the local performance to a remote device via the network using the network interface, and may be performed alone or in combination with one or more other operations depicted in FIG. 8. The remote device may include a remote processor, a remote network interface in electronic communication with the remote processor and configured to transmit and receive data over the network, a remote input device in electronic communication with the remote processor, and a remote output device in electronic communication with the remote processor. The remote device may be configured to, using the remote processor: receive the local performance via the network using the remote network interface; play the backing track via the remote output device; play the local performance simultaneously with the backing track via the remote output device; record a remote performance via the remote input device; and transmit the remote performance to the processor via the network using the remote network interface.

In some implementations, recording the remote performance may be simultaneous with the recording the local performance. In further implementations, recording the remote performance may begin before the playing the local performance is completed. In further implementations, playing the local performance may be simultaneous with the playing the remote performance. In other implementations, playing the backing track may comprise playing the introduction segment prior to the playing the local performance.

An operation 810 may include, at the processor, receiving the remote performance via the network using the network interface, and may be performed alone or in combination with one or more other operations depicted in FIG. 8.

An operation 812 may include, using the processor, playing the remote performance simultaneously with the backing track via the output device, and may be performed alone or in combination with one or more other operations depicted in FIG. 8.

The method 800 may further include, using the processor, playing an interlude via the output device, and may be performed alone or in combination with one or more other operations depicted in FIG. 8.

For the various user interactions during the method 800, an indicator may be used. In such implementations, the method 800 may include, prior to an input and/or output, or otherwise to indicate state or timing, triggering an indicator. Such an indicator may include one or more of a display element on a screen of a computing device, a light indicator, a vibrator, or a sound emitted from the output device, wherein the output device is an audio output device. The indicator may be controlled, for example, by the processor.

Figure 9:
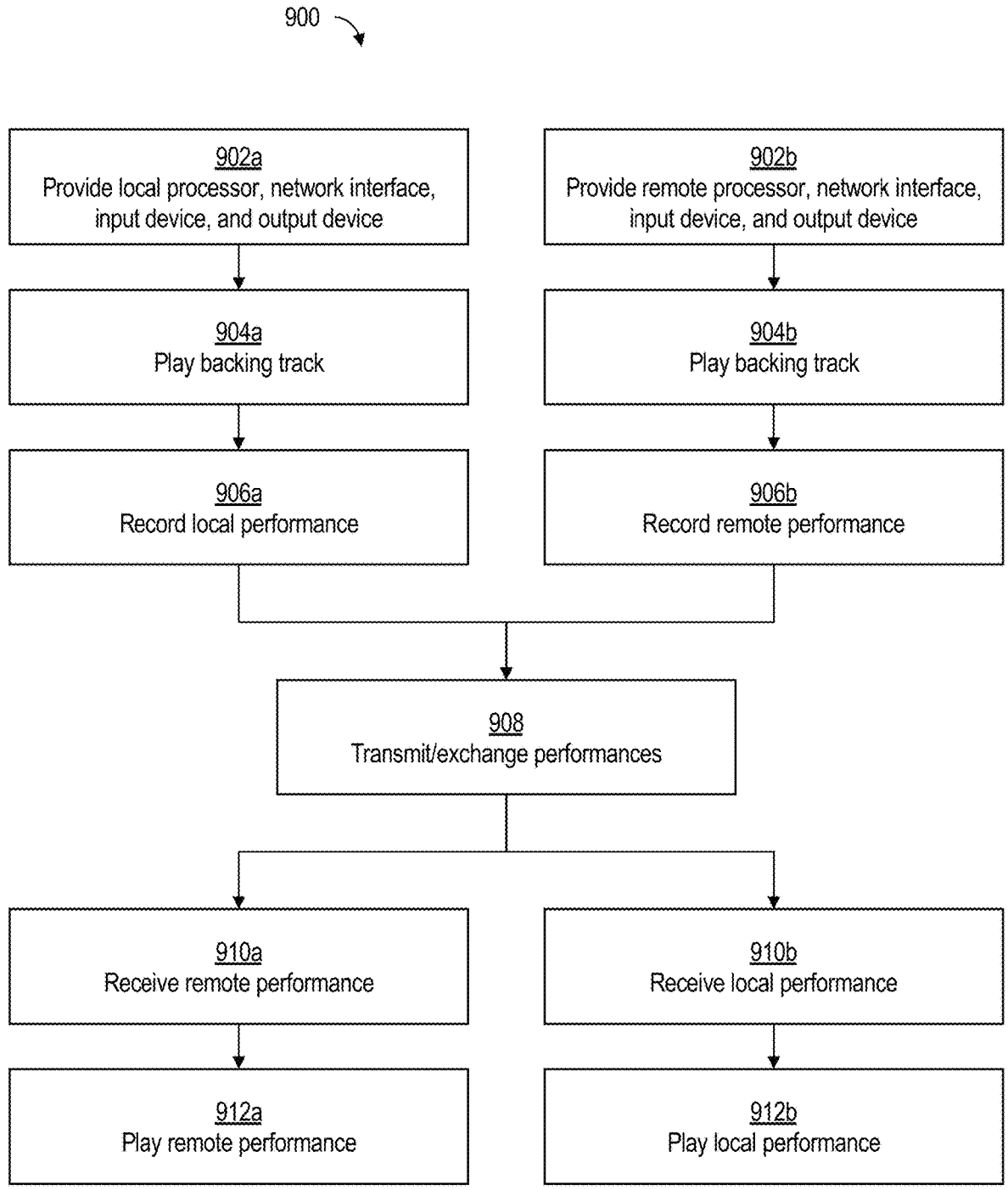
FIG. 9 is a flowchart illustrating an example method for multi-party collaboration, according to one or more implementations herein.

FIG. 9 is a flowchart illustrating an example method 900 for multi-party collaboration, according to one or more implementations herein. In some implementations, one or more operations may be performed by a one or more of the devices of FIG. 1A through FIG. 7. In some implementations, one or more operations may be performed by another device or system or group of devices or systems separate from or including these. Additionally, or alternatively other devices, components, or systems, may be employed to perform the operations.

An operation 902a may include providing a local processor, a local network interface in electronic communication with the processor and configured to transmit and receive data over a network, a local input device in electronic communication with the processor, and a local output device in electronic communication with the processor and may be performed alone or in combination with one or more other operations depicted in FIG. 9. Such components may compose a local device.

An operation 902b may include providing a remote processor, a remote network interface in electronic communication with the remote processor and configured to transmit and receive data over the network, a remote input device in electronic communication with the remote processor, and a remote output device in electronic communication with the remote processor. Such components may compose a remote device.

The local device may be configured to, using the local processor: receive the remote performance via the network using the local network interface; play the backing track via the local output device; play the remote performance simultaneously with the backing track via the local output device; record a local performance via the local input device; and transmit the local performance to the remote processor via the network using the local network interface.

The remote device may be configured to, using the remote processor: receive the local performance via the network using the remote network interface; play the backing track via the remote output device; play the local performance simultaneously with the backing track via the remote output device; record a remote performance via the remote input device; and transmit the remote performance to the processor via the network using the remote network interface.

An operation 904a may include, using the local processor, playing a backing track via the local output device, and may be performed alone or in combination with one or more other operations depicted in FIG. 9.

An operation 904b may include, using the remote processor, playing a backing track via the remote output device, and may be performed alone or in combination with one or more other operations depicted in FIG. 9.

An operation 906a may include, using the processor, recording a local performance via the local input device, and may be performed alone or in combination with one or more other operations depicted in FIG. 9.

An operation 906b may include, using the remote processor, recording a remote performance via the remote input device, and may be performed alone or in combination with one or more other operations depicted in FIG. 9.

An operation 908 may include, using the local processor and the remote processor, via the local network interface and the remote network interface, respectively, transmit the local performance to the remote processor and the remote performance to the local processor, and may be performed alone or in combination with one or more other operations depicted in FIG. 9. It will be understood that, in some implementations, the operation 908 may begin simultaneously or near the beginning of the operations 906a and 906b. As such, in some implementations, recording the remote performance may be simultaneous with the recording the local performance. In further implementations, recording the remote performance may begin before the playing the local performance is completed. In further implementations, playing the local performance may be simultaneous with the playing the remote performance. In other implementations, playing the backing track may comprise playing the introduction segment prior to the playing the local performance.

An operation 910a may include, at the local processor, receiving the remote performance via the network using the local network interface, and may be performed alone or in combination with one or more other operations depicted in FIG. 9.

An operation 910b may include, at the remote processor, receiving the local performance via the network using the remote network interface, and may be performed alone or in combination with one or more other operations depicted in FIG. 9.

An operation 912a may include, using the local processor, playing the remote performance simultaneously with the backing track via the local output device, and may be performed alone or in combination with one or more other operations depicted in FIG. 9.

An operation 912b may include, using the remote processor, playing the local performance simultaneously with the backing track via the remote output device, and may be performed alone or in combination with one or more other operations depicted in FIG. 9.

Although FIGS. 8-9 depict example methods 800-900, respectively, and operations thereof, in some implementations, a method illustrated herein may include additional operations, fewer operations, differently arranged operations, or different operations than the operations depicted in FIGS. 8-9. Moreover, or in the alternative, two or more of the operations depicted in FIGS. 8-9 may be performed at least partially in parallel.

The invention is limited only by the appended claims. Variations, characteristics, advantages, implementations, constructions, arrangements, terminology, materials, dimensions, embodiments, illustrations, depictions, and examples composing the above description and accompanying drawings show some possible implementations of the invention without limiting the invention. It is not necessary that every implementation of the invention achieve or possess every advantage, purpose, or characteristic identified herein, and as such, one skilled in the art may effect various additions, changes, modifications, or omissions without departing from the scope or spirit of the invention or its legal equivalents.

All ranges are inclusive of the stated limits, the orders of magnitude thereof, and all values and ranges substantially therebetween unless otherwise defined. Unless otherwise stated, every use of "and" forms an inclusive list comprising at least the conjoined elements, and every use of "or" forms an inclusive list comprising at least one element of conjoined elements. Unless otherwise stated, singular usage (e.g., 'a', 'an', or 'the') includes plurals of the same.

The order of recitations in a claim do not imply a temporal or ordered relationship unless unavoidable by the plain language of that claim. No claim may be interpreted to invoke 35 U.S.C. § 112(f) unless that claim recites "means for" or "step for."

I claim:

1. A method for multi-party collaboration, comprising:
providing a processor, a network interface in electronic communication with the processor and configured to transmit and receive data over a network, an input device in electronic communication with the processor, and an output device in electronic communication with the processor; and
using the processor:
playing a backing track via the output device;
recording a local performance via the input device;
transmitting the local performance to a remote device via the network using the network interface, the remote device including a remote processor, a remote network interface in electronic communication with the remote processor and configured to transmit and receive data over the network, a remote input device in electronic communication with the remote processor, and a remote output device in electronic communication with the remote processor, wherein the remote device is configured to, using the remote processor:
receive the local performance via the network using the remote network interface;
play the backing track via the remote output device;
play the local performance simultaneously with the backing track via the remote output device;

record a remote performance via the remote input device; and transmit the remote performance to the processor via the network using the remote network interface;

receiving the remote performance via the network using the network interface; and playing the remote performance simultaneously with the backing track via the output device.

2. The method of claim 1, wherein the recording the remote performance is simultaneous with the recording the local performance.

3. The method of claim 2, wherein the playing the local performance is simultaneous with the playing the remote performance.

4. The method of claim 1, further comprising, using the processor, playing an interlude via the output device.

5. The method of claim 1, wherein the recording the remote performance begins before the playing the local performance is completed.

6. The method of claim 4, further comprising, using the processor:

using the network interface, determining a streaming latency between the processor and the remote processor; and setting a duration of the interlude based on the streaming latency and a performance continuity rule.

7. The method of claim 6, wherein the performance continuity rule includes a tempo of the backing track and the duration is equal to a maximum of the streaming latency and a multiple of the tempo.

8. The method of claim 1, wherein the backing track comprises an introduction segment, and wherein the playing the backing track via the output device comprises playing the introduction segment via the output device prior to the recording the local performance.

9. The method of claim 8, wherein the playing the backing track comprises playing the introduction segment prior to the playing the local performance.

10. The method of claim 1, further comprising, prior to playing the backing track, using the processor, selecting the backing track.

11. The method of claim 1, wherein the backing track includes a local performance segment and a remote performance segment, and wherein the playing the backing track via the output device comprises playing the local performance segment of the backing track simultaneously with the recording the local performance and the playing the backing track via the remote output device comprises playing the remote performance segment of the backing track simultaneously with the recording the remote performance.

12. The method of claim 1, further comprising, using the processor, triggering an indicator, wherein the indicator includes one or more of:

a display element on a screen of a computing device;

a vibrator;

a light indicator; or a sound emitted from the output device, wherein the output device is an audio output device.

13. A system for multi-party collaboration, comprising:

a processor;

a network interface in electronic communication with the processor and configured to transmit and receive data over a network;

an input device in electronic communication with the processor; and an output device in electronic communication with the processor;

wherein the processor is configured to:

play a backing track via the output device;

record a local performance via the input device;

transmit the local performance to a remote device via the network using the network interface, the remote device including a remote processor, a remote network interface in electronic communication with the remote processor and configured to transmit and receive data over the network, a remote input device in electronic communication with the remote processor, and a remote output device in electronic communication with the remote processor, wherein the remote device is configured to, using the remote processor:

receive the local performance via the network using the remote network interface;

play the backing track via the remote output device;

play the local performance simultaneously with the backing track via the remote output device;

record a remote performance via the remote input device; and transmit the remote performance to the processor via the network using the remote network interface;

receive the remote performance via the network using the network interface; and play the remote performance simultaneously with the backing track via the output device.

14. The system of claim 13, wherein the recording the remote performance is simultaneous with the recording the local performance and the playing the local performance is simultaneous with the playing the remote performance.

15. The system of claim 13, further comprising, using the processor, playing an interlude via the output device.

16. The system of claim 15, further comprising, using the processor:

using the network interface, determining a streaming latency between the processor and the remote processor; and setting a duration of the interlude based on the streaming latency and a performance continuity rule including a tempo of the backing track, wherein the duration is equal to a maximum of the streaming latency and a multiple of the tempo.

17. The system of claim 13, wherein the local performance comprises either or both of an audio or a visual recording.

18. The system of claim 13, wherein the input device comprises one or more of an instrument, a microphone, or a camera.

19. The system of claim 13, wherein the output device comprises an audio output device, and the remote output device comprises a remote audio output device.

20. A tangible, non-transitory, computer-readable medium for multi-party collaboration, the tangible, non-transitory, computer-readable medium having instructions thereupon which when executed by a processor in electronic communication with a network interface configured to transmit and receive data over a network, an input device, and an output device cause the processor to:

play a backing track via the output device;

record a local performance via the input device;

transmit the local performance to a remote device via the network using the network interface, the remote device including a remote processor, a remote network interface in electronic communication with the remote processor and configured to transmit and receive data over the network, a remote input device in electronic communication with the remote processor, and a remote output device in electronic communication with the remote processor, wherein the remote device is configured to, using the remote processor:
  receive the local performance via the network using the remote network interface;
  play the backing track via the remote output device;
  play the local performance simultaneously with the backing track via the remote output device;
  record a remote performance via the remote input device; and
  transmit the remote performance to the processor via the network using the remote network interface;
receive the remote performance via the network using the network interface; and
play the remote performance simultaneously with the backing track via the output device.

* * * * *